3,034,888
METHOD FOR PREPARING CUBIC NICKEL SINGLE CRYSTALS

Robert Allen Lefever, Palos Verdes Estates, Calif., assignor to Texaco Inc., a corporation of Delaware
No Drawing. Filed Oct. 29, 1958, Ser. No. 770,282
13 Claims. (Cl. 75—82)

The present invention relates to a novel method for preparing metal crystals by reduction in a fused salt medium, and more particularly is concerned with controlling crystal habit so as to prepare small discrete cubic single crystals of nickel which may be used in studies involving catalysis, surface adsorption, and surface activities; or may be valuable for infrared, magnetic and thermo-magnetic studies.

This application is a continuation-in-part of my application Serial No. 738,984, filed June 2, 1958, now U.S. Letters Patent 2,990,270, dated June 27, 1961.

In accordance with the principles of this invention, there is provided a novel method for preparing nickel crystals comprising the steps of first preparing in a crucible a molten mixture of a first halide of nickel, and one or more halides of at least one other metal selected from the group consisting of the alkali and alkaline earth metals. The production of cubic crystals is assured by also including a small quantity of a halide of at least one metal selected from the group consisting of cobalt, copper, and iron. There is then added into the molten halide mixture a reducing agent characterized by its ability to reduce nickel halide without reducing the alkali or alkaline earth metal halide. Ordinarily the reducing agent is hydrogen, lithium aluminum hydride or a reducing metal which is above nickel in the electromotive series. Among the reducing metals which can be used successfully are aluminum, magnesium, and zinc. The halide of nickel is thus reduced to small discrete cubic single crystals of nickel metal in the melt.

The melt is then cooled slowly to room temperature and solidifies as a cake. Separation of the nickel crystals from the cake is accomplished by dissolving in water the water soluble portion of the cake so that the nickel desired crystals and water insoluble residues accumulate on the bottom of a vessel. The residual salt solution is then decanted off. The insoluble residues are further separated from the metal crystals by washing them off with water while positioning a magnet on the outside of the vessel so as to retain the metal crystals.

Ordinarily, the decanted salt solution still is rich in the halide of nickel so that it may be evaporated to dryness, and the resulting recovered dried salts may be reused for the production of metal crystals by remelting them and proceeding with the reduction in the manner described above for the primary crystallization operation.

The alkali or alkaline earth metal halide melt may comprise a halide of an individual metal such as lithium, sodium, potassium, or magnesium, or it may comprise a mixture of two or more of these halides. Ordinarily, the chlorides are preferred, but satisfactory results also have been obtained with the bromides and iodides.

All of the reducing agents mentioned above have been used successfully, but some difficulty attaches to the use of hydrogen and magnesium since both of these substances are so light that they will not sink in the melt to give as uniform and complete a reduction as may be desired. For example, magnesium tends to float on the melt so that concentration gradients are set up, resulting in the formation of long dendrites rather than the more desirable spherical polyhedra. Aluminum and zinc, on the other hand, sink in the melt and are more uniformly distributed.

As far as temperature is concerned, the primary criterion is that it be sufficiently high for the mixture of halides to be in molten condition. Ordinarily, when metallic aluminum, magnesium and zinc are to be used as the reducing agent the molten halide pool should be at a temperature above the melting point of the particular metal in order to assure that the oxide coating on the metal surface will be disrupted. If the melt is below the melting point of a reducing metal, it would not be dispersed uniformly therein and dendrites would be produced rather than discrete spherical (symmetrical) polyhedra. Ordinarily, a satisfactory range of temperature for the melt is from 500° to 1200° C. Temperature influences the size of the crystals obtained. At the lower end of the temperature range smaller crystal sizes generally result for any given reaction time; at the higher end of the temperature range more and larger crystal particles are obtained for any given reaction time.

While not absolutely necessary, it is desirable to exclude oxygen from contact with the melt at least during the initial period before the reducing agent is added. This ordinarily is accomplished by maintaining an atmosphere of argon, nitrogen or any other inert non-reactive gas above the melt. Once the reducing agent has been introduced the melt itself is under reducing conditions so that the presence of oxygen is not harmful. Of course, when hydrogen is the reducing agent oxygen should be excluded completely because it forms an explosive mixture.

When hydrogen is used as the reducing agent the melt is brought up to a desired reaction temperature under a blanketing atmosphere of a non-reactive gas such as argon, and then the hydrogen is added to the argon blanket for reaction with the melt. However, operations can be conducted successfully by using a pure hydrogen blanket which acts not only as the reducing agent but as the protector against oxidation.

The effect of time is primarily upon the size of the crystals obtained. The longer the melt is held at temperature with the reducing agent therein, the larger are the crystals obtained.

The concentration of the halide of nickel in the fused salt has not been found to be critical. There may be variation in shape of the individual crystal particles, but not in the crystallographic orientation of the surfaces. For example, in melts comprising a mixture of potassium chloride and nickel chloride and a small amount cobalt, copper, or iron chloride the recovered cubic nickel crystals generally will have the shape of elongated rods with square cross-sections when the proportion of nickel chloride is below 10% and when it is above 75% by weight. Between 10 and 75% by weight of nickel chloride, the cubic crystals will be cubic and symmetrical (spherical) in shape.

In performing the invention, the habit controlling metal chloride of at least one of cobalt, copper and iron should be present in quantity between 0.5 and 5% by weight of the nickel chloride, with especially satisfactory results having been achieved with 2%.

Upon the addition of reducing agent to a melt, the crystals of reduced metal form immediately. Holding the melt at the reaction temperature allows these crystals to grow in size but not significantly in number.

A number of specific examples of how the principles of the present invention have been successfully applied to the growth of cubic nickel single crystals are described below. In each of the examples, after the reaction mixture had been cooled to room temperature distilled water was added to dissolve the soluble halides, the nickel crystals were held at the bottom of the container with an externally positioned magnet and the solution and non-magnetic solids were poured off and filtered. Repeated washings with distilled water removed foreign material from the crystals while they were held magnetically at the bottom of the container.

*Example 1*

10 grams reagent grade nickel chloride, 10 grams reagent grade potassium chloride (KCl), and 0.2 gram reagent grade cupric chloride (CuCl$_2$·2H$_2$O) were mixed, placed in a crucible and heated to 1000° C. under a continuous flow of argon. Four pellets of aluminum, each weighing about 30 milligrams, were added to the melt at a rate of one pellet every 15 minutes. The melt was held at 1000° C. for one hour after addition of the last pellet, and then allowed to cool to room temperature under argon.

The nickel product consisted of small cubes with edge lengths of 0.5–5 microns.

*Example 2*

Under conditions identical to Example 1, but using cobalt chloride (CoCl$_2$·6H$_2$O) nickel cubes were obtained with excellent surface quality and edge lengths of 10–20 microns.

*Example 3*

Under conditions identical to Example 1, but using ferrous chloride (FeCl$_2$·4H$_4$O) nickel cubes were obtained with excellent surface quality and edge lengths of 10–20 microns.

Under conditions identical to Examples 1–3, but omitting the copper, cobalt, an iron chlorides completely, the nickel product consisted of octahedra, triangular platelets, and hexagonal platelets.

Obviously, many modifications and variations of the invention, as hereinbefore set forth, may be made without departing from the spirit and scope thereof, and therefore only such limitations should be imposed as are indicated in the appended claims.

I claim:

1. A method for preparing cubic single crystals of nickel comprising the steps of preparing a molten mixture consisting essentially of a nickel halide, at least one second halide of at least one metal selected from the group consisting of the alkali and alkaline earth metals, and a halide of at least one metal selected from the group consisting of cobalt, copper, and iron in a minor amount between 0.5 and 5% of said nickel halide by weight effective to develop cubic orientation in the resultant nickel crystals, and adding into said molten mixture a reducing agent for said nickel halide.

2. A method in accordance with claim 1, wherein said reducing agent is selected from the group consisting of hydrogen, lithium aluminum hydride, aluminum, magnesium, and zinc.

3. A method in accordance with claim 1, wherein said last named halide is present in the amount of about 2% of said nickel halide by weight.

4. A method in accordance with claim 1, wherein said last named halide is cobalt chloride.

5. A method in accordance with claim 1, wherein said last named halide is copper chloride.

6. A method in accordance with claim 1, wherein said last named halide is iron chloride.

7. A method in accordance with claim 1, wherein said second halide is potassium chloride, and wherein said reducing agent is aluminum.

8. A method in accordance with claim 1, also comprising the step of maintaining a blanket of a nonoxidizing gas above said molten mixture at least prior to the step of adding a reducing agent to said molten mixture.

9. A method in accordance with claim 1, also comprising cooling and solidifying said molten mixture after addition of said reducing agent, dissolving in water the water soluble portion thereof, and separating the resulting solution and insoluble residue from the crystals of said first-named metal.

10. A method in accordance with claim 1 wherein said second halide is potassium chloride.

11. A method in accordance with claim 10 wherein said last named halide is present in the amount of about 2% of said nickel halide by weight.

12. A method for preparing cubic single crystals of nickel comprising the steps of preparing an initial mixture consisting essentially of a nickel halide, at least one second halide of at least one metal selected from the group consisting of the alkali and alkaline earth metals, and a halide of at least one metal selected from the group consisting of cobalt, copper, and iron in a minor amount between 0.5 and 5% of said nickel halide by weight effective to develop cubic orientation in the resultant nickel crystals, then melting said mixture, and then adding into the molten mixture a reducing agent for said nickel halide.

13. In the method for preparing nickel crystals comprising the steps of preparing a molten mixture of a nickel halide with at least one second halide of at least one metal selected from the group consisting of alkali and alkaline earth metals, and adding into the molten mixture a reducing agent for reducing said nickel halide to nickel crystals, the improvement which comprises controlling the orientation of said nickel crystals so as to produce predominantly cubically oriented single crystals by maintaining in said molten mixture a halide of at least one metal selected from the group consisting of cobalt, copper, and iron in a minor amount between 0.5 and 5% of said nickel halide by weight effective to develop such cubic orientation.

References Cited in the file of this patent

UNITED STATES PATENTS

| | | |
|---|---|---|
| 2,396,792 | Kroll | Mar. 19, 1946 |
| 2,396,794 | Kroll | Mar. 19, 1946 |
| 2,760,858 | Findlay | Aug. 28, 1956 |

FOREIGN PATENTS

| | | |
|---|---|---|
| 762,541 | Great Britain | Nov. 28, 1956 |